(12) United States Patent
Simonson et al.

(10) Patent No.: US 8,834,680 B2
(45) Date of Patent: Sep. 16, 2014

(54) FILLER COMPOSITION

(75) Inventors: Patrik Simonson, Sävedalen (SE); Michael Persson, Västra Frölunda (SE)

(73) Assignee: AKZO Nobel N.V., Arnhem (NL)

( * ) Notice: Subject to any disclaimer, the term of this patent is extended or adjusted under 35 U.S.C. 154(b) by 0 days.

(21) Appl. No.: 12/668,968

(22) PCT Filed: Jul. 14, 2008

(86) PCT No.: PCT/EP2008/059149
§ 371 (c)(1),
(2), (4) Date: Feb. 18, 2010

(87) PCT Pub. No.: WO2009/010483
PCT Pub. Date: Jan. 22, 2009

(65) Prior Publication Data
US 2010/0186917 A1    Jul. 29, 2010

Related U.S. Application Data

(60) Provisional application No. 60/949,923, filed on Jul. 16, 2007.

(30) Foreign Application Priority Data

Jul. 16, 2007 (EP) ..................................... 07112507

(51) Int. Cl.

| | | |
|---|---|---|
| *D21H 17/26* | (2006.01) | |
| *D21H 17/28* | (2006.01) | |
| *D21H 17/33* | (2006.01) | |
| *D21H 17/41* | (2006.01) | |
| *D21H 17/63* | (2006.01) | |
| *D21H 17/69* | (2006.01) | |
| *C08L 1/28* | (2006.01) | |
| *D21H 17/37* | (2006.01) | |
| *D21H 17/45* | (2006.01) | |
| *D21H 17/68* | (2006.01) | |
| *D21H 17/67* | (2006.01) | |
| *D21H 17/56* | (2006.01) | |
| *D21H 17/66* | (2006.01) | |
| *D21H 17/29* | (2006.01) | |

(52) U.S. Cl.
CPC ............ *D21H 17/67* (2013.01); *D21H 17/375* (2013.01); *C08L 1/286* (2013.01); *D21H 17/455* (2013.01); *D21H 17/68* (2013.01); *D21H 17/675* (2013.01); *D21H 17/56* (2013.01); *D21H 17/66* (2013.01); *D21H 17/26* (2013.01); *D21H 17/29* (2013.01)
USPC ...................... 162/168.3; 162/158; 162/164.6; 162/177; 162/181.1; 162/181.3; 162/181.4; 162/181.8; 162/185; 106/162.71; 106/162.81; 106/206.1; 106/436; 106/463; 106/469; 106/487; 106/501.1

(58) Field of Classification Search
USPC ............. 162/164.1–164.6, 168.1–168.7, 175, 162/177, 178, 181.1–181.9, 183; 106/162.71, 162.72, 162.8–162.82, 106/205.01, 206.1, 207.1, 208.1, 217.01, 106/162.1–162.2, 162.8–162.8, 217.1, 400, 106/401, 436, 461, 463, 469, 486, 487, 499, 106/501.1
See application file for complete search history.

(56) References Cited

U.S. PATENT DOCUMENTS

| | | | |
|---|---|---|---|
| 4,272,297 A | * | 6/1981 | Brooks et al. ................. 106/465 |
| 4,388,150 A | | 6/1983 | Sunden et al. |

(Continued)

FOREIGN PATENT DOCUMENTS

| | | |
|---|---|---|
| EP | 0 227 465 A1 | 7/1987 |
| EP | 0 748 897 A2 | 12/1996 |

(Continued)

OTHER PUBLICATIONS

Baker, C. "Methylcellulose & Carboxymethylcellulose: Uses in Paper Conservation" The Book and Paper Group Annual, vol. 1 [online] The American Institute for Conservation, 1982 [retrieved on Sep. 28, 2007], Retrieved from the Internet: <URL: http://aic.stanford.edu/sg/bpg/annual/v01/bp01-04.html>.*

(Continued)

*Primary Examiner* — Dennis Cordray
(74) *Attorney, Agent, or Firm* — Robert C. Morriss

(57) ABSTRACT

The present invention relates to a filler composition comprising a) a filler, b) a cationic inorganic compound, c) a cationic organic compound, and d) an anionic polysaccharide, wherein the filler is present in an amount of at least about 1% by weight, based on the total weight of the composition, the anionic polysaccharide is present in an amount of about 1 to about 100 kg/ton, based on the weight of filler, and wherein the composition is substantially free from fibers. The invention further relates to a filler composition comprising a), b), c) and d) as defined above wherein the filler is present in an amount of at least about 1% by weight, based on the total weight of the composition, the cationic inorganic and organic compounds are each present in an amount of from about 0 to about 30 kg/ton, based on the weight of filler, whereby the composition comprises at least one of the cationic inorganic and organic compounds, and the anionic polysaccharide has a degree of substitution of net anionic groups of up to about 0.65. The invention further relates to a method of preparing a filler composition comprising mixing a), b), c) and d) as defined above. The invention further relates to a filler composition obtainable by the method, use of a filler composition as an additive to an aqueous cellulosic suspension in a papermaking process, and a process of producing paper comprising adding the filler composition to an aqueous cellulosic suspension. The invention further relates to paper obtainable by the process and paper comprising the filler composition.

33 Claims, 1 Drawing Sheet

(56) References Cited

U.S. PATENT DOCUMENTS

| | | | |
|---|---|---|---|
| 4,522,686 A | | 6/1985 | Dumas |
| 4,710,270 A | | 12/1987 | Sunden et al. |
| 4,940,785 A | | 7/1990 | Stober et al. |
| 4,943,349 A | * | 7/1990 | Gomez .................. 162/158 |
| 4,961,825 A | | 10/1990 | Andersson et al. |
| 4,980,025 A | | 12/1990 | Andersson et al. |
| 5,127,994 A | | 7/1992 | Johansson |
| 5,176,891 A | | 1/1993 | Rushmere |
| 5,368,833 A | | 11/1994 | Johansson et al. |
| 5,458,679 A | * | 10/1995 | Fairchild .................. 106/465 |
| 5,512,135 A | * | 4/1996 | Carre et al. .................. 162/175 |
| 5,603,803 A | | 2/1997 | Raak |
| 5,603,805 A | | 2/1997 | Andersson et al. |
| 5,759,346 A | * | 6/1998 | Vinson .................. 162/123 |
| 5,942,087 A | * | 8/1999 | Pruszynski .................. 162/175 |
| 6,048,438 A | * | 4/2000 | Rosencrance et al. ........ 162/158 |
| 6,238,520 B1 | * | 5/2001 | Greenwood .................. 162/164.1 |
| 6,475,341 B1 | * | 11/2002 | Johnston et al. .................. 162/183 |
| 2003/0145966 A1 | * | 8/2003 | Terpstra et al. .................. 162/175 |
| 2003/0188738 A1 | | 10/2003 | Laleg |
| 2004/0171719 A1 | * | 9/2004 | Neivandt et al. .................. 524/47 |
| 2005/0155520 A1 | * | 7/2005 | Van Der Horst et al. ..... 106/465 |
| 2005/0252629 A1 | * | 11/2005 | Laleg .................. 162/158 |
| 2007/0151688 A1 | | 7/2007 | Solhage et al. |
| 2009/0020250 A1 | | 1/2009 | Kimura et al. |

FOREIGN PATENT DOCUMENTS

| | | |
|---|---|---|
| JP | 2001-510251 A | 7/2001 |
| JP | 2006-257606 A | 9/2006 |
| WO | WO 94/05596 A1 | 3/1994 |
| WO | WO 95/13325 A1 | 5/1995 |
| WO | WO 95/23021 A1 | 8/1995 |
| WO | WO 98/30753 A1 | 7/1998 |
| WO | WO 99/04092 A1 | 1/1999 |
| WO | WO 00/66491 A1 | 11/2000 |
| WO | WO 00/66492 A1 | 11/2000 |
| WO | WO 2005/061793 A1 | 7/2005 |
| WO | WO 2005/097678 A1 | 10/2005 |
| WO | WO 2005/100241 A1 | 10/2005 |
| WO | WO 2005/124021 A1 | 12/2005 |
| WO | WO 2006/049545 A1 | 5/2006 |
| WO | WO 2006/049546 A1 | 5/2006 |
| WO | WO 2006/049547 A1 | 5/2006 |
| WO | WO 2006/100996 A1 | 9/2006 |
| WO | WO 2008/150230 A1 | 12/2008 |

OTHER PUBLICATIONS

"Filler Minerals Reference, A Guide to Filler Properties and Uses," Information Sheet [online] R.T. Vanderbilt Company, Inc. 2009 [retrieved on Jan. 20, 2011], Retrieved from the Internet: <URL: http://www.rtvanderbilt.com/VR703forweb.pdf>.*

International Preliminary Report on Patentability for International Application No. PCT/EP2008/059149 dated Oct. 9, 2009.

International Search Report and Written Opinion for International Application No. PCT/EP2008/059149 dated Dec. 30, 2008.

Sears, Jr. G.W., "Determination of Specific Surface Area of Colloidal Silica by Titration with Sodium Hydroxide," Analytical Chemistry vol. 28, No. 12 (1956), pp. 1981-1983.

Iler, R. K. et al., "Degree of Hydration of Particles of Colloidal Silica in Aqueous Solution," J. Phys. Chem. 60 (1956), pp. 955-957.

English language translation of Chinese Office Action for Chinese Patent Application No. 2008800248264 dated Feb. 23, 2011.

Office Action for Canadian Patent Application No. 2,693,903 dated May 18, 2012.

Office Action for Japanese Patent Application No. 2010-516477 dated Jul. 24, 2012.

English language translation of Japanese Office Action for Japanese Patent Application No. 2010-516477 dated Jul. 24, 2012.

Office Action for CL 2008800248264 dated Sep. 18, 2012.

Office Action English translation for CL 2008800248264 dated Sep. 18, 2012.

European Search Report for Application No./Patent No. 11164265.8 dated Dec. 15, 2012.

Office Action for CN 2008-002019 dated Jan. 16, 2013.

* cited by examiner

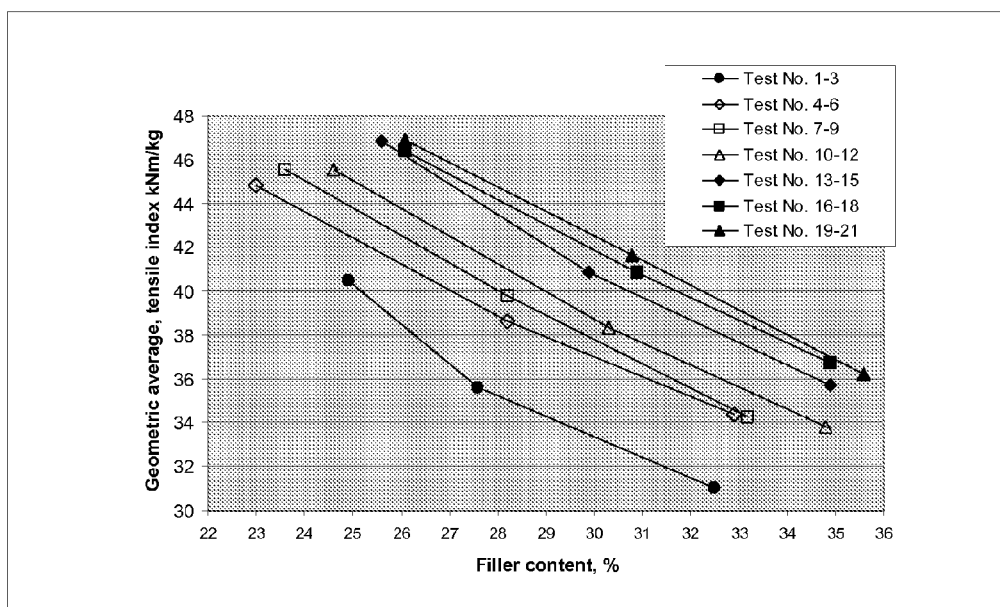

US 8,834,680 B2

FILLER COMPOSITION

This application is a national stage filing under 35 U.S.C. §371 of PCT/EP2008/059149, filed Jul. 14, 2008, which claims priority to European Patent Application No. 07112507.4, filed Jul. 16, 2007, and U.S. Provisional Patent Application No. 60/949,923, filed on Jul. 16, 2007, the contents of which are incorporated herein by reference in their entirety.

FIELD OF THE INVENTION

The present invention relates to a filler composition, a method of preparing the filler composition, various uses of the filler composition, including the use as an additive in papermaking, a process of producing paper in which the filler composition is added to an aqueous cellulosic suspension, paper obtained by the process as well as various uses of the paper obtained by the process.

BACKGROUND OF THE INVENTION

Fillers and filler compositions are well known and widely used in papermaking applications in order to reduce paper costs by replacing more expensive virgin cellulosic fibers by less expensive filler. Fillers also make it possible to improve certain paper properties such as, for example, surface smoothness, printability and optical properties like opacity and brightness. However, other paper properties may be adversely affected. For instance, filled paper usually exhibit lower strength properties compared to unfilled paper. It would be advantageous to be able to provide a filler composition that imparts improved strength and other properties to paper. It would also be advantageous to be able to provide a method of preparing such a filler composition. It would also be advantageous to be able to provide filled paper exhibiting improved strength and other properties. It would also be advantageous to be able to provide an improved process of producing filled paper.

SUMMARY OF THE INVENTION

The present invention is directed to a filler composition comprising
   a) a filler,
   b) a cationic inorganic compound,
   c) a cationic organic compound, and
   d) an anionic polysaccharide,
wherein the filler is present in an amount of at least about 1% by weight, based on the total weight of the composition, the anionic polysaccharide is present in an amount of about 1 to about 100 kg/ton, based on the weight of filler, and wherein the composition is substantially free from fibers.

The present invention is further directed to a filler composition comprising
   a) a filler,
   b) a cationic inorganic compound,
   c) a cationic organic compound, and
   d) an anionic polysaccharide,
wherein the filler is present in an amount of at least about 1% by weight, based on the total weight of the composition, the cationic inorganic and organic compounds are each present in an amount of from about 0 to about 30 kg/ton, based on the weight of filler, whereby the composition comprises at least one of the cationic inorganic and organic compounds, and the anionic polysaccharide has a degree of substitution of net anionic groups of up to about 0.65.

The present invention is further directed to a method of preparing a filler composition comprising mixing
   a) a filler,
   b) a cationic inorganic compound,
   c) a cationic organic compound, and
   d) an anionic polysaccharide,
whereby in the obtained filler composition the filler is present in an amount of at least about 1% by weight, based on the total weight of the composition, the anionic polysaccharide is present in an amount of from about 1 to about 100 kg/ton, based on the weight of filler, and wherein the mixing is performed in the substantial absence of fibers.

The present invention is further directed to a method of preparing a filler composition comprising mixing
   a) a filler,
   b) a cationic inorganic compound,
   c) a cationic organic compound, and
   d) an anionic polysaccharide,
whereby in the obtained filler composition the filler is present in an amount of at least about 1% by weight, based on the total weight of the composition, the cationic inorganic and organic compounds are each present in an amount of from about 0 to about 30 kg/ton, based on the weight of filler, whereby the composition comprises at least one of the cationic inorganic and organic compounds, and the anionic polysaccharide has a degree of substitution of the net anionic groups of up to about 0.65.

The present invention is further directed to a filler composition obtainable by the method as defined herein.

The present invention is also directed to the use of a filler composition as defined herein as an additive in a papermaking process.

The invention is further directed to a process of producing paper comprising adding a filler composition as defined herein to a cellulosic suspension and draining the obtained suspension.

The invention is further directed to paper obtainable by the process as defined herein, paper comprising a filler composition as defined herein, and various uses of the paper.

DETAILED DESCRIPTION OF THE INVENTION

In accordance with the present invention there is provided a filler composition which can be used in numerous applications and which is particularly suitable for use as a papermaking additive and which imparts improved strength properties to paper. For example, at constant filler contents, filled paper comprising the filler composition of the invention exhibits improved strength properties. At constant paper strength properties, filled paper comprising the filler composition of the invention can have considerably higher filler contents. Strength properties of filled paper of the invention that are substantially maintained or improved include tensile strength, tensile stiffness, tensile index, bending resistance, z-strength, Scott Bond, wax pick. Also, dusting and linting are substantially maintained and/or improved. Further advantages associated with the filler composition of the invention in papermaking applications include good or improved paper machine runability, good compatibility with drainage and retention aids, good or improved retention of filler and additives which means low contents thereof in the white water, good compatibility with sizing agents, i.e. good or improved sizing effects, in particular in combinations of stock (internal) and surface (external) sizing applications, easy calendaring in that low pressure can be applied to get good paper smoothness, and energy savings, in particular in the drying section of the paper machine. Furthermore, the filler composition can be produced by a simple, efficient and versatile method using conventional papermaking fillers and other inexpensive raw materials. Accordingly, the present invention makes it possible to increase the filler loading in paper, to provide filled paper with improved strength and other properties and to provide an improved papermaking process, thereby leading to an improved paper product and economic benefits.

Furthermore, in respect of applications other than papermaking, the filler composition of the invention can be used to enhance strength (green strength) of traditional and advanced ceramics, powder composites as well as in powder metallurgy. With improved green strength, the handling of bodies before firing or sintering will result in less damage of bodies, and bodies with increased green strength can be easier or better machined to right dimensions and designs.

The composition according to the present invention comprises a filler. The term "filler", as used herein, is meant to include synthetic and natural mineral fillers and pigments, including porous, bulky, plastic and expandable fillers and pigments. Examples of suitable fillers according to the invention include wollastonites, kaolinites, e.g. kaolin, china clay, titanium dioxide, gypsum, talcites, e.g. talc, hydrotalcite, manasseite, pyroaurite, sjögrenite, stichtite, barbertonite, takovite, reevesite, desautelsite, motukoreaite, wermlandite, meixnerite, coalingite, chloromagalumite, carrboydite, honessite, woodwardite, iowaite, hydrohonessite and mountkeithite, silicas, e.g. precipitated silica and precipitated alumino silicates, smectites, e.g. montmorillonite/bentonite, hectorite, beidelite, nontronite and saponite, hydrogenated aluminum oxides (aluminum trihydroxides), calcium sulphate, barium sulphate, calcium oxalate, as well as natural and synthetic calcium carbonates. Examples of suitable natural and synthetic calcium carbonates include chalk, ground marble, ground calcium carbonate (GCC) and precipitated calcium carbonate (PCC), including any of the various crystalline forms or morphologies that exist, e.g. calcite of rhombohedral, prismatic, tabular, cuboid and scalenohedral forms and aragonite of acicular form. The filler is suitably kaolin or calcium carbonate like ground calcium carbonate and precipitated calcium carbonate.

The composition according to the present invention may comprise one or more cationic inorganic compounds. Examples of suitable cationic inorganic compounds include inorganic mono-, di- and polyvalent cations and polyelectrolytes, e.g. aluminum compounds. Examples of suitable aluminum compounds include alum (aluminum sulphate), aluminates, e.g. sodium and potassium aluminates, and polyaluminum compounds, e.g. polyaluminum chlorides, polyaluminum sulphates, polyaluminum silicate sulphates and mixtures thereof. Preferably, the cationic inorganic compound is a polyaluminum chloride.

The composition according to the present invention may comprise one or more cationic organic compounds. Usually, the cationic organic compound is water-soluble or water-dispersible, preferably water-soluble. The cationic organic compound can be synthetic or derived from natural sources and rendered cationic. Examples of suitable cationic organic compounds include cationic organic polymers, e.g. condensation polymers like cationic polyamines, cationic polyamideamines, cationic polyethylene imines and cationic dicyandiamide polymers, cationic vinyl addition polymers of ethylenically unsaturated cationic monomer or monomer blend comprising at least one cationic monomer like cationic acrylamide-based polymers, cationic acrylate-based polymers, cationic vinylamine/vinylformamide-based polymers and cationic polymers based on diallyl dialkyl ammonium chlorides. Examples of suitable ethylenically unsaturated cationic monomers include dialkylaminoalkyl (meth)acrylates and dialkylaminoalkyl (meth) acrylamides, preferably in quaternised form, and diallyl dimethyl ammonium chloride (DADMAC). The cationic polymers of ethylenically unsaturated monomer are usually prepared from about 10 to 100 mole % cationic monomer and 0 to 90 mole % other monomer, the sum of percentages being 100. The amount of cationic monomer is usually at least 80 mole %, suitably 100 mole %.

The cationic organic compound usually has a weight average molecular weight of at least about 1,000, suitably at least about 2,000 and preferably at least about 5,000. Usually, the weight average molecular weight is up to about 4,000,000, suitably up to about 2,000,000 and preferably up to about 700,000. The charge density of the cationic organic compound is usually at least about 0.2 meq/g, suitably at least about 1 meq/g, and the charge density is usually up to about 15 meq/g, suitably up to about 10 meq/g.

The composition according to the present invention comprises an anionic polysaccharide. Suitably the anionic polysaccharide is water-dispersable or water-soluble, preferably water-soluble or at least partly water-soluble. The anionic polysaccharide contains anionic groups, which can be native and/or introduced by chemical treatment of the polysaccharide. Examples of native anionic polysaccharides include native potato starch, which contains a substantial amount of covalently bound phosphate monoester groups. The anionic polysaccharide may also contain cationic groups as long as the polysaccharide is net anionic, or has a net anionic charge, i.e. the number of anionic groups is higher than the number of cationic groups, or the degree of substitution or anionic groups is higher than the degree of substitution or cationic groups. In a preferred embodiment, the anionic polysaccharide is free or substantially free from cationic groups.

Examples of suitable anionic groups include carboxylate, e.g. carboxyalkyl, sulphate, sulphonate, e.g. sulphoalkyl, phosphate and phosphonate groups in which the alkyl group can be methyl, ethyl propyl and mixtures thereof, suitably methyl; suitably the anionic polysaccharide contain an anionic group comprising a carboxylate group, e.g. a carboxyalkyl group. The counter-ion of the anionic group is usually an alkali metal or alkaline earth metal, suitably sodium. The anionic groups can also exist in their acid form, whereby the corresponding anionic groups are formed in an aqueous environment.

Examples of suitable cationic groups include salts of amines, suitably salts of tertiary amines, and quaternary ammonium groups, preferably quaternary ammonium groups. The substituents attached to the nitrogen atom of amines and quaternary ammonium groups can be same or different and can be selected from alkyl, cycloalkyl, and alkoxyalkyl, groups, and one, two or more of the substituents together with the nitrogen atom can form a heterocyclic ring. The substituents independently of each other usually comprise from 1 to about 24 carbon atoms, preferably from 1 to about 8 carbon atoms. The nitrogen of the cationic group can be attached to the polysaccharide by means of a chain of atoms which suitably comprises carbon and hydrogen atoms, and optionally O and/or N atoms. Usually the chain of atoms is an alkylene group with from 2 to 18 and suitably 2 to 8 carbon atoms, optionally interrupted or substituted by one or more heteroatoms, e.g. O or N such as alkyleneoxy group or hydroxy propylene group. Preferred anionic polysaccharides containing cationic groups include those obtained by reacting the anionic polysaccharide with a quaternization agent selected from 2, 3-epoxypropyl trimethyl ammonium chloride, 3-chloro-2-hydroxypropyl trimethyl ammonium chloride and mixtures thereof.

The anionic polysaccharide of this invention can contain non-ionic groups such as alkyl or hydroxy alkyl groups, e.g. hydroxymethyl, hydroxyethyl, hydroxypropyl, hydroxybutyl and mixtures thereof, e.g. hydroxyethyl methyl, hydroxypropyl methyl, hydroxybutyl methyl, hydroxyethyl ethyl, hydroxypropoyl and the like. In a preferred embodiment of the invention, the anionic polysaccharide contains both anionic and non-ionic groups.

Examples of suitable anionic polysaccharides of the invention include glucans, e.g. dextrans and celluloses, galactomannans, e.g. guar gums, chitins, chitosans, glycans, galactans, xanthan gums, pectins, mannans, dextrins, alginates and carragenanes. Examples of suitable starches include potato, corn, wheat, tapioca, rice, waxy maize, etc. Preferably, the anionic polysaccharide is selected from cellulose derivatives, preferably anionic cellulose ethers. Examples of suitable anionic polysaccharides and cellulose derivatives include carboxyalkyl celluloses, e.g. carboxymethyl cellulose, carboxyethyl cellulose, carboxy-propyl cellulose, sulphoethyl carboxymethyl cellulose, carboxymethyl hydroxyethyl cellulose ("CM-HEC"), carboxymethyl cellulose wherein the cellulose is substituted with one or more non-ionic substituents, preferably carboxymethyl cellulose ("CMC"). Examples of suitable cellulose derivatives include those disclosed in U.S. Pat. No. 4,940,785, hereby incorporated by reference.

The anionic polysaccharide usually has a degree of substitution of net anionic groups ("$DS_{NA}$") of at least about 0.001 or at least about 0.01, suitably at least about 0.05 or at least about 0.10 and preferably at least about 0.15. The a degree of substitution of net anionic groups of the anionic polysaccharide is usually up to about 1.0 or up to about 0.75, suitably up to about 0.65 or up to about 0.50 and preferably up to about 0.45. When the anionic polysaccharide is free from cationic groups, it has a degree of substitution of anionic groups ("$DS_A$") that is equal to the degree of substitution of net anionic groups defined herein, i.e. $DS_A = DS_{NA}$.

The anionic polysaccharide usually has a weight average molecular weight of at least 2,000 Dalton or at least about 5,000 Dalton, suitably at least 20,000 Dalton or at least about 50,000 Dalton, and the average molecular weight is usually up to about 30,000,000 Dalton or up to about 25,000,000 Dalton, suitably up to about 1,000,000 Dalton or up to about 500,000 Dalton.

The present filler composition is preferably an aqueous composition, i.e. it preferably contains water. Other components such as, for example, biocides, preservative agents, by-products of the production process of the filler, cationic inorganic and organic compounds and anionic polysaccharide, e.g. salts and dispersing agents, etc. may of course also be present in the filler composition. In a preferred embodiment, the filler composition is substantially free from fibers and fibrils of cellulose or lignocellulose. In another preferred embodiment, the filler composition is substantially free from fibers of at least about 4 mm in length. In yet another preferred embodiment, the filler composition comprises fibers or fibrils of cellulose or lignocellulose. In yet another preferred embodiment, the filler composition is substantially free from cationic starch.

The components of the filler composition, including the filler, cationic inorganic and organic compounds and anionic polysaccharide, can be present in the filler composition in amounts which can vary within wide limits depending on, inter alia, type and number of components, intended use, desired cost savings, desired paper strength, etc.

The filler is usually present in the filler composition in an amount of at least about 1% by weight, based on the total weight of the composition, suitably at least about 2% by weight or at least about 5% by weight, and preferably at least about 10% by weight. The filler is usually present in an amount of up to 99% by weight, based on the total weight of the composition, suitably up to about 75% by weight or up to about 50% by weight, and preferably up to about 45% by weight.

According to one embodiment, the cationic inorganic compound is not present in the filler composition. However, if present, the cationic inorganic compound is usually present in the filler composition in an amount of at least about 0.01 kg/ton, based on the weight of filler, suitably at least about 0.1 kg/ton, or at least about 0.5 kg/ton, and preferably at least about 1.0 kg/ton. Furthermore, if present, the cationic inorganic compound is usually present in the filler composition in an amount of up to about 30 kg/ton, based on the weight of filler, suitably up to about 15 kg/ton, or up to about 10 kg/ton, and preferably up to about 5 kg/ton. When the cationic inorganic compound is an aluminum compound, the amounts defined herein are calculated as $Al_2O_3$ based on the weight of filler.

According to one embodiment, the cationic organic compound is not present in the filler composition. However, if present, the cationic organic compound is usually present in the filler composition in an amount of at least about 0.01 kg/ton, based on the weight of filler, suitably at least about 0.1 kg/ton, or at least about 0.5 kg/ton, and preferably at least about 1.0 kg/ton. Furthermore, if present, the cationic organic compound is usually present in the filler composition in an amount of up to about 30 kg/ton, based on the weight of filler, suitably up to about 15 kg/ton, or up to about 10 kg/ton, and preferably up to about 5 kg/ton.

According to one embodiment, the anionic polysaccharide is usually present in the filler composition in an amount of at least about 1 kg/ton, based on the weight of filler, suitably at least about 2 kg/ton, or at least about 3 kg/ton, and preferably at least about 5 kg/ton. The anionic polysaccharide is usually present in the filler composition in an amount of up to about 100 kg/ton, based on the weight of filler, suitably up to about 50 kg/ton, or up to about 30 kg/ton, and preferably up to about 20 kg/ton.

The filler composition usually has a weight ratio of cationic fixing agent(s) to anionic polysaccharide from about 10:1 to about 1:1000, suitably from about 2:1 to about 1:100, and preferably from about 1:1 to about 1:40. According to one embodiment, the cationic fixing agent(s) comprises cationic inorganic compound and/or cationic organic compound.

The filler composition of the invention can be free from water. If present, water is usually present in the filler composition in an amount of from about 1% by weight, based on the total weight of the composition, suitably at least about 25% by weight or at least about 50% by weight, and preferably at least about 55% by weight. If present, water is usually present in an amount of up to 99% by weight, based on the total weight of the composition, suitably up to about 98% by weight or up to about 95% by weight, and preferably up to about 90% by weight, the sum of percentages being 100.

The filler composition may have a fiber content of from about 0 to about 5% by weight, based on the composition. Preferably, the filler composition comprises fibers or fibrils of cellulose or lignocellulose in an amount of less than about 1% by weight, based on the filler.

The present invention also relates to a method of making a filler composition which comprises mixing the components as defined herein, preferably in amounts and proportions as defined herein. The components may be mixed in any order and it is preferred that mixing is performed after each addition. Preferably, the cationic inorganic and organic compounds are added to the filler, either separately or as a premix. When using the separate mode of addition, the cationic inorganic compound can be added to the filler prior to adding the cationic organic compound, the cationic organic compound can be added to the filler prior to adding the cationic inorganic compound, or the cationic inorganic and organic compounds can be added simultaneously but separately. Usually, the anionic polysaccharide is added to the filler subsequently to adding the cationic inorganic and organic compounds. If water is present, it is preferred that water is present from the start of the mixing method, e.g. by using an aqueous suspension containing the filler. The remaining components may also be used as aqueous solutions, dispersions or suspensions. The method can be a batch, semi-batch or continuous method.

In a preferred embodiment, the mixing is performed in semi-batch wise or continuously in a filler line of a paper machine. Hereby the components of the filler composition are introduced to an aqueous flow and the obtained flow of aqueous filler composition according to the invention is added to an aqueous suspension comprising cellulosic fibers which is fed into a headbox which ejects the obtained suspension onto a forming wire. Water is drained from the suspension to provide a wet paper web which is further dewatered and dried in the drying section of the paper machine.

The filler composition of the invention can be used as an additive to and in producing ceramics, paints, paper, plastics, powder composites, etc. Preferably, the filler composition is used in papermaking, and hereby it is used as an additive to an aqueous suspension containing cellulosic fibers.

The present invention also relates to a process of producing paper which comprises providing an aqueous suspension containing cellulosic fibers ("cellulosic suspension"), adding to the cellulosic suspension the present filler composition, and dewatering the cellulosic suspension to form a web or sheet of paper. In the process, other additives may of course also be used, either by being introduced into the cellulosic suspension, or applied to the web or sheet of paper obtained. Examples of such additives include conventional fillers, optical brightening agents, sizing agents, dry strength agents, wet strength agents, cationic coagulants, drainage and retention aids, etc.

Examples of suitable conventional fillers include the fillers mentioned above, suitably kaolin, china clay, titanium dioxide, gypsum, talc, natural and synthetic calcium carbon-ates, e.g. chalk, ground marble, ground calcium carbonate and precipitated calcium carbonate, hydrogenated aluminum oxides (aluminum trihydroxides), calcium sulphate, barium sulphate, calcium oxalate, etc.

Examples of suitable wet strength agents include cationic polyamines and polyaminoamides, including the products obtained by reacting polyamines and polyaminoamides with epichlorohydrin.

Examples of suitable sizing agents include non-cellulose-reactive sizing agents, e.g. rosin-based sizing agents like rosin-based soaps, rosin-based emulsions/dispersions, cellulose-reactive sizing agents, e.g. emulsions/dispersions of acid anhydrides like alkyl and alkenyl succinic anhydrides (ASA), alkenyl and alkyl ketene dimers (AKD) and multimers, as well as anionic, cationic and amphoteric polymers of ethylenically unsaturated monomers, e.g. copolymers of styrene and acrylates. One or more sizing agents can be added to the cellulosic suspension, applied to the paper in a surface sizing application, or both. In a preferred embodiment, at least one sizing agent is added to the cellulosic suspension and at least one sizing agent is applied to the paper. Sized and filled paper according to the invention show excellent strength and sizing properties.

Examples of suitable ketene dimers include those of the general formula (I) below, wherein $R^1$ and $R^2$ represent saturated or unsaturated hydrocarbon groups, usually saturated hydrocarbons, the hydrocarbon groups suitably having from 8 to 36 carbon atoms, usually being straight or branched chain alkyl groups having 12 to 20 carbon atoms, such as hexadecyl and octadecyl groups. Examples of suitable acid anhydrides include those of the general formula (II) below, wherein $R^3$ and $R^4$ can be identical or different and represent saturated or unsaturated hydrocarbon groups suitably containing from 8 to 30 carbon atoms, or $R^3$ and $R^4$ together with the —C—O—C— moiety can form a 5 to 6 membered ring, optionally being further substituted with hydrocarbon groups containing up to 30 carbon atoms, such as isooctadecenyl succinic anhydride.

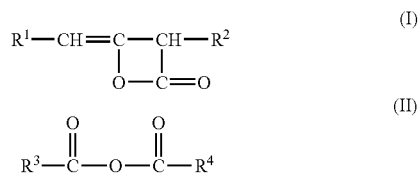

Suitable sizing agents include the compounds disclosed in U.S. Pat. No. 4,522,686, which is hereby incorporated herein by reference.

Examples of suitable cationic coagulants include water-soluble organic polymeric coagulants and inorganic coagulants. The cationic coagulants can be used singly or together, i.e. a polymeric coagulant can be used in combination with an inorganic coagulant. Examples of suitable water-soluble organic polymeric cationic coagulants include condensation polymers like cationic polyamines, cationic polyamideamines, cationic polyethylene imines and cationic dicyandiamide polymers, cationic vinyl addition polymers of ethylenically unsaturated cationic monomer or monomer blend comprising at least one cationic monomer like cationic acrylamide-based polymers, cationic acrylate-based polymers, cationic vinylamine/vinylformamide-based polymers and cationic polymers based on diallyl dialkyl ammonium chlorides. Examples of suitable ethylenically unsaturated cationic monomers include dialkylaminoalkyl (meth)acrylates and dialkylaminoalkyl (meth) acrylamides, preferably in quaternised form, and diallyl dimethyl ammonium chloride (DADMAC). The cationic polymers of ethylenically unsaturated monomer are usually prepared from about 10 to 100 mole % cationic monomer and 0 to 90 mole % other monomer, the sum of percentages being 100. The amount of cationic monomer is usually at least 80 mole %, suitably 100 mole %. The organic polymeric cationic coagulants usually have a weight average molecular weight of at least about 1,000, suitably at least about 2,000 and preferably at least about 5,000. Usually, the weight average molecular weight is up to about 4,000,000, suitably up to about 2,000,000 and preferably up to about 700,000. Examples of suitable inorganic coagulants include aluminum compounds, e.g. alum, aluminates, e.g. sodium and potassium aluminates, and polyaluminum compounds, e.g. polyaluminum chlorides, polyaluminum sulphates, polyaluminum silicate sulphates and mixtures thereof.

Examples of suitable drainage and retention aids include organic polymers, inorganic materials, e.g. anionic microparticulate materials, e.g. siliceous materials like colloidal silica-based particles, montmorillonite/bentonite, and combinations thereof. The term "drainage and retention aid", as used herein, refers to one or more additives which, when being added to an aqueous cellulosic suspension, give better drainage and/or retention than is obtained when not adding said one or more additives.

Examples of suitable organic polymers include anionic, amphoteric and cationic starches; anionic, amphoteric and cationic acrylamide-based polymers, including essentially linear, branched and cross-linked anionic and cationic acrylamide-based polymers; as well as cationic poly(diallyldimethyl ammonium chloride); cationic polyethylene imines; cationic polyamines; cationic polyamideamines and vinylamide-based polymers, melamine-formaldehyde and urea-formaldehyde resins. Suitably, the drainage and retention aid comprises least one cationic or amphoteric polymer, preferably cationic polymer. Cationic starch and cationic polyacrylamide are particularly preferred polymers and they can be used singly, together with each other or together with other polymers, e.g. other cationic and/or anionic polymers. The weight average molecular weight of the polymer is suitably above about 1,000,000 and preferably above about 2,000,000. The upper limit of the weight average molecular weight of the polymer is not critical; it can be about 50,000,000, usually about 30,000,000 and suitably about 25,000,000. However, the weight average molecular weight of polymers derived from natural sources may be higher.

Silica-based particles, i.e. particles based on $SiO_2$ or silicic acid, are usually supplied in the form of aqueous colloidal dispersions, so-called sols. Examples of suitable silica-based particles include colloidal silica and different types of polysilicic acid, either homopolymerised or co-polymerised. The silica-based sols can be modified and contain other elements, e.g. aluminum, boron, nitrogen, zirconium, gallium, titanium and the like, which can be present in the aqueous phase and/or in the silica-based particles. Examples of suitable silica-based particles of this type include colloidal aluminum-modified silica and aluminum silicates. Mixtures of such suitable silica-based particles can also be used. Examples of suitable anionic silica-based particles include those having an average particle size below about 100 nm, preferably below about 20 nm and more preferably in the range of from about 1 to about 10 nm. As conventional in the silica chemistry, the particle size refers to the average size of the primary particles, which may be aggregated or non-aggregated. The specific surface area of the silica-based particles is suitably above about 50 $m^2/g$ and preferably above about 100 $m^2/g$. Generally, the specific surface area can be up to about 1700 $m^2/g$. The specific surface area is measured by means of titration with NaOH in a well known manner, e.g. as described by G.W. Sears in Analytical Chemistry 28 (1956): 12, 1981-1983 and in the U.S. Pat. No. 5,176,891. The given area thus represents the average specific surface area of the particles. Further examples of suitable silica-based particles include those that are present in a sol having a S-value in the range of from 5 to 50%. The S-value can be measured and calculated as described by Iler & Dalton in J. Phys. Chem. 60 (1956), 955-957. The S-value indicates the degree of aggregation or microgel formation and a lower S-value is indicative of a higher degree of aggregation.

Examples of suitable combinations of drainage and retention aids include cationic polymers and anionic microparticulate materials like siliceous materials, e.g. cationic starch and anionic colloidal silica-based particles; cationic acrylamide-based polymer and anionic colloidal silica-based particles; cationic acrylamide-based polymer, anionic acrylamide-based polymer and anionic colloidal silica-based particles or bentonite; and cationic acrylamide-based polymer and bentonite.

The filler composition according to the invention can be added to the cellulosic suspension in amounts which can vary within wide limits depending on, inter alia, type of cellulosic suspension, type of filler, type of paper produced, point of addition, etc. The filler composition is usually added in an amount of at least about 1 kg/ton, calculated as dry filler based on dry cellulosic fibers, suitably at least about 10 kg/ton or at least about 50 kg/ton, preferably at least 100 kg/ton. The filler composition is usually added in an amount of up to 3000 kg/ton or up to 1000 kg/ton or 750 kg/ton, calculated as dry filler based on dry cellulosic fibers, suitably up to about 500 kg/ton or up to about 450 kg/ton, preferably up to 400 kg/ton. Paper according to the invention usually has a filler content within the range of from 0.1 to about 75% by weight, suitably from about 1 to about 50% by weight, and preferably from about 10 to about 40% by weight.

When using other components in the process, these components can be added to the cellulosic suspension or applied to the paper in amounts which can vary within wide limits depending on, inter alia, type and number of components, type of cellulosic suspension, filler content, type of paper produced, point of addition, etc. Sizing agents are usually introduced into the cellulosic suspension and/or applied to the paper in amounts of at least about 0.01% by weight, suitably at least about 0.1% by weight, based on the weight of dry fibers, and the upper limit is usually about 2% by weight, suitably about 0.5% by weight. Generally, drainage and retention aids are introduced into the cellulosic suspension in amounts that give better drainage and/or retention than what is obtained when not using these aids. Drainage and retention aids, dry strength agents and wet strength agents, independently of each other, are usually introduced in an amount of at least about 0.001% by weight, often at least about 0.005% by weight, based on the weight of dry fibers, and the upper limit is usually about 5% by weight and suitably about 1.5% by weight.

The filler composition of this invention is used for the production of paper. The term "paper", as used herein, of course include not only paper and the production thereof, but also other cellulosic sheet or web-like products, such as for example board and paperboard, and the production thereof. The process can be used in the production of paper from different types of aqueous suspensions of cellulosic fibers and the suspensions should suitably contain at least about 25% by weight and preferably at least about 50% by weight of such fibers, based on dry substance. The suspension can be based on fibers from chemical pulp such as sulphate, sulphite and organosolv pulps, mechanical pulp such as thermo-mechanical pulp, chemo-thermomechanical pulp, refiner pulp and groundwood pulp, from both hardwood and softwood, and can also be based on recycled fibers, optionally from de-inked pulps, and mixtures thereof. The pH of the suspension, the stock, can be within the range of from about 3 to about 10. The pH is suitably above about 3.5 and preferably within the range of from about 4 to about 9.

Paper according to the invention can be used in numerous applications, suitably the paper is used as writing and printing paper.

The invention is further illustrated in the following examples which, however, are not intended to limit the same. Parts and % relate to parts by weight and % by weight, respectively, unless otherwise stated.

EXAMPLE 1

The following components were used in the Examples, unless otherwise stated:
GCC: Ground calcium carbonate (Hydrocarb 60, Omya),
PAC: Polyaluminum chloride (Eka ATC 8210)
PA: Cationic polyamine (Eka ATC 4150)
Polydadmac: Cationic polyDADMAC(RB 2329, SNF)
CMC 1: Carboxymethyl cellulose (Finnfix 300, Noviant), degree of substitution of net anionic groups of 0.76
CMC 2: Carboxymethyl cellulose (Gabrosa 947A, Akzo Nobel), degree of substitution of net anionic groups of 0.3-0.4
A-starch: Anionic starch (Pearlsize 158, Lyckeby)
C-Starch: Cationic starch (Perlbond 970, Lyckeby)
C-PAM 1: Cationic polyacrylamide (Eka DS 22)
C-PAM 2: Cationic polyacrylamide (Eka PL 1510)
Silica: Aqueous sol of anionic silica-based particles (Eka NP 320)

EXAMPLE 2

This Example illustrates a method of preparing filler compositions according to the invention. An aqueous PAC solution (10% by weight PAC, calculated as $Al_2O_3$) was added dropwise under stirring to an aqueous GCC slurry (45% by weight GCC) and the resulting slurry was stirred for some minutes whereupon an aqueous CMC solution (1% by weight CMC) was added and the obtained filler composition was diluted with water to 20% by weight solids. The obtained filler compositions are shown in Table 1 (Test Nos. 7-12 and 16-21) and Table 2 (Test Nos. 7, 13 and 19).

EXAMPLE 3

This Example illustrates another method of preparing filler compositions according to the invention. An aqueous PA solution (0.5% by weight PA) was added dropwise under stirring to an aqueous GCC slurry (45% by weight GCC) and the resulting slurry was stirred for some minutes whereupon an aqueous CMC solution (1% by weight CMC) was added and the obtained filler composition was diluted with water to 20% by weight solids. The obtained filler compositions are shown in Table 2 (Test Nos. 2-6).

EXAMPLE 4

This Example illustrates yet another method of preparing filler compositions according to the invention. An aqueous PAC solution (10% by weight PAC, calculated as $Al_2O_3$) was added dropwise under stirring to an aqueous GCC slurry (45% by weight GCC) and the resulting slurry was stirred for some minutes whereupon an aqueous PA solution (0.5% by weight PA) was added dropwise. The resulting slurry was stirred for some minutes whereupon an aqueous CMC solution (1% by weight CMC) was added and the obtained filler composition was diluted with water to 20% by weight solids. The obtained filler compositions are shown in Table 2 (Test Nos. 8-12, 14-18 and 20-24).

EXAMPLE 5

This Example illustrates methods of preparing filler compositions used for comparison. Some filler compositions were prepared using the method according to Example 2 except that no PAC was used. The obtained filler compositions are shown in Table 1 (Test. Nos. 4-6 and 13-15) and Table 2 (Test. No. 1). One filler composition was prepared using the method according to Example 2 without addition of PAC and CMC. These filler compositions are shown in Table 1 (Test Nos. 1-3).

EXAMPLE 6

This Example illustrates the use in papermaking of filler compositions according to Examples 2 and 5 and evaluation of the strength properties of the obtained paper products. Paper sheets were made using a Dynamic Sheet Former (Formette Dynamique), supplied by Fibertech AB, Sweden, and dry strength performance of the obtained paper was evaluated by a Tensile Strength Tester supplied by Lorentzen & Wettre, Sweden. The furnish was based on needle bleached kraft pulp (NBKP), leaf bleached kraft pulp (LBKP) and GCC as filler.

Consistency of the aqueous cellulosic suspension (stock) was 0.5% by weight and conductivity was adjusted to 0.5 mS/cm by addition of sodium sulphonate. The stock was stirred at a speed of 700 rpm and chemicals were added to the stock present in the mixing chest of the Dynamic Sheet Former followed by stirring. The filler compositions according to Examples 2-5 were added to stock in varying amounts to get different filler contents in the range of from 23 to 35.6% by weight. The following chemicals were also added in a consistent manner in the following sequence before making the paper sheets: C-Starch (8 kg/ton based on dry paper sheet) added 45 s before drainage, C-PAM 1 (1 kg/ton based on dry paper sheet) added 30 s before drainage, C-PAM 2 (0.2 kg/ton based on dry paper sheet) added 15 before drainage, Silica (0.5 kg/ton, calculated as $SiO_2$ and based on dry paper sheet) added 5 s before drainage. Paper sheets were then formed by pumping the stock from the mixing chest through traversing nozzle into the rotating drum onto the water film on top of the wire, draining the stock to form a sheet, pressing and drying the sheet. The sheets were then evaluated using the Tensile Strength Tester. The results are shown in Table 1 and FIG. 1, in which PAC [kg/ton] means the amount of PAC calculated as $Al_2O_3$ per ton of GCC, and CMC 1 [kg/ton] and CMC 2 [kg/ton] mean the amount of the specific CMC per ton of GCC.

TABLE 1

| Test No. | PAC [kg/ton] | CMC 1 [kg/ton] | CMC 2 [kg/ton] | Filler Content [wt. %] | Tensile Index [kNm/kg] |
|---|---|---|---|---|---|
| 1 | — | — | — | 24.9 | 40.43 |
| 2 | — | — | — | 27.6 | 35.57 |
| 3 | — | — | — | 32.5 | 31.01 |
| 4 | — | 10 | — | 23.0 | 44.81 |
| 5 | — | 10 | — | 28.2 | 38.61 |
| 6 | — | 10 | — | 32.9 | 34.35 |
| 7 | 0.2 | 10 | — | 23.6 | 45.53 |
| 8 | 0.2 | 10 | — | 28.2 | 39.79 |
| 9 | 0.2 | 10 | — | 33.2 | 34.24 |
| 10 | 0.8 | 10 | — | 24.6 | 45.54 |
| 11 | 0.8 | 10 | — | 30.3 | 38.34 |
| 12 | 0.8 | 10 | — | 34.8 | 33.78 |
| 13 | — | — | 10 | 25.6 | 46.81 |
| 14 | — | — | 10 | 29.9 | 40.84 |
| 15 | — | — | 10 | 34.9 | 35.71 |
| 16 | 0.2 | — | 10 | 26.1 | 46.4 |
| 17 | 0.2 | — | 10 | 30.9 | 40.83 |
| 18 | 0.2 | — | 10 | 34.9 | 36.73 |
| 19 | 0.8 | — | 10 | 26.1 | 46.89 |
| 20 | 0.8 | — | 10 | 30.8 | 41.62 |
| 21 | 0.8 | — | 10 | 35.6 | 36.22 |

EXAMPLE 7

This Example illustrates the use in papermaking of filler compositions according to Examples 2-5. Strength properties of the obtained paper products were evaluated according to the general procedure of Example 6 except that the filler compositions were added in amounts so as to achieve filler content of the obtained paper products of approximately 35% by weight. Drainage performance was evaluated by means of a Dynamic Drainage Analyser (DDA), available from Akribi AB, Sweden, which measures the time for draining a set volume of stock. The stock was stirred in a baffled jar at a speed of 1500 rpm throughout the test while additions were made of filler compositions as well as chemicals as described in Example 6 (except C-PAM 1 was not added). A stock volume of 800 ml was drained through a wire when removing a plug and applying vacuum to that side of the wire opposite to the side on which the stock is present. Drainage performance is reported as the dewatering time in seconds [sec]. Retention performance (first pass retention) was evaluated by means of a nephelometer by measuring the turbidity of the filtrate from the Dynamic Drainage Analyser (DDA), the white water, obtained by draining the stock obtained in the drainage performance test. Turbidity is reported in nephelometric units [NTU]. Particle Cationic Demand (PCD) was evaluated by means of a Mütec PCD on the filtrate from the DDA. 10 ml of the mixed filtrate was used. PCD is reported as micro equivalents of anionic charge per litre of liquid (peq/L). The results are shown in Table 2, in which PA [kg/ton] means the amount of PA per ton of GCC.

diluted with water to 20% by weight solids. The obtained filler compositions are shown in Table 3.

EXAMPLE 9

This Example illustrates yet another method of preparing filler compositions according to the invention. An aqueous PAC solution (10% by weight PAC, calculated as $Al_2O_3$) was added dropwise under stirring to an aqueous GCC slurry (45% by weight GCC) and the resulting slurry was stirred for some minutes whereupon an aqueous polydadmac solution (0.5% by weight polydadmac) was added dropwise. The resulting slurry was stirred for some minutes whereupon an aqueous CMC solution (1% by weight CMC) was added and the obtained filler composition was diluted with water to 20% by weight solids. The obtained filler compositions are shown in Table 3.

EXAMPLE 10

This Example illustrates a method of preparing filler compositions according to the invention. An aqueous PAC solution (10% by weight PAC, calculated as $Al_2O_3$) was added dropwise under stirring to an aqueous GCC slurry (45% by weight GCC) and the resulting slurry was stirred for some minutes whereupon an aqueous A-starch solution (2% by weight A-starch) was added and the obtained filler composition was diluted with water to 20% by weight solids. Some filler compositions were prepared without addition of PAC. The obtained filler compositions are shown in Table 4.

TABLE 2

| Test No. | PAC [kg/ton] | PA [kg/ton] | CMC 2 [kg/ton] | Dewatering Time [sec] | Turbidity [NTU] | PCD (µeq/L) | Tensile Index [kNm/kg] |
|---|---|---|---|---|---|---|---|
| 1  | —   | —    | 10 | 7.8 | 518 | 125 | 28.60 |
| 2  | —   | 0.25 | 10 | 7.4 | 442 | 114 | —     |
| 3  | —   | 0.5  | 10 | 7.0 | 352 | 91  | 29.70 |
| 4  | —   | 1    | 10 | 7.5 | 191 | 84  | 30.10 |
| 5  | —   | 2    | 10 | 7.0 | 164 | 53  | 29.90 |
| 6  | —   | 4    | 10 | 4.9 | 168 | 22  | 33.20 |
| 7  | 0.5 | —    | 10 | 7.4 | 318 | 97  | 30.10 |
| 8  | 0.5 | 0.25 | 10 | 7.0 | 223 | 89  | —     |
| 9  | 0.5 | 0.5  | 10 | 6.2 | 199 | 64  | 29.80 |
| 10 | 0.5 | 1    | 10 | 6.7 | 132 | 51  | 31.20 |
| 11 | 0.5 | 2    | 10 | 4.6 | 120 | 32  | 31.90 |
| 12 | 0.5 | 4    | 10 | 4.5 | 140 | 14  | 33.30 |
| 13 | 1   | —    | 10 | 6.8 | 168 | 73  | 30.40 |
| 14 | 1   | 0.25 | 10 | 5.7 | 206 | 51  | —     |
| 15 | 1   | 0.5  | 10 | 5.6 | 104 | 46  | 30.70 |
| 16 | 1   | 1    | 10 | 5.2 | 120 | 36  | 31.80 |
| 17 | 1   | 2    | 10 | 3.9 | 103 | 23  | 31.00 |
| 18 | 1   | 4    | 10 | 4.1 | 113 | 13  | 33.60 |
| 19 | 2   | —    | 10 | 4.1 | 100 | 26  | 30.40 |
| 20 | 2   | 0.25 | 10 | 4.1 | 101 | 28  | —     |
| 21 | 2   | 0.5  | 10 | 4.3 | 82  | 23  | 29.90 |
| 22 | 2   | 1    | 10 | 3.6 | 84  | 21  | 32.00 |
| 23 | 2   | 2    | 10 | 4.2 | 75  | 16  | 30.20 |
| 24 | 2   | 4    | 10 | 4.2 | 68  | 11  | 32.70 |

EXAMPLE 8

This Example illustrates another method of preparing filler compositions according to the invention. An aqueous polydadmac solution (0.5% by weight polydadmac) was added dropwise under stirring to an aqueous GCC slurry (45% by weight GCC) and the resulting slurry was stirred for some minutes whereupon an aqueous CMC solution (1% by weight CMC) was added and the obtained filler composition was

EXAMPLE 11

This Example illustrates the use in papermaking of filler compositions according to Examples 2, 5, and 8. Drainage, retention and PCD were evaluated according to the general procedure of Example 7. Filler compositions were added in amounts so as to achieve filler content of approximately 35% by weight. To measure the bonded amount of CMC to filler the CMC remaining content in liquid phase of filler composition was evaluated by means of the Anthrone method (calibrated against CMC). Sample preparation was made by centrifugation to separate liquid from filler. The liquid was analysed for CMC expressed as concentration (g/L). Theoretical concentration of CMC in liquid phase, in all tests in Table 3 is 2.5 g/L. The results are shown in Table 3, in which PAC [kg/ton] means the amount of PAC calculated as $Al_2O_3$ per ton of GCC and in which polydadmac [kg/ton] means the amount of polydadmac per ton of GCC.

TABLE 3

| Test No. | PAC [kg/ton] | Poly dadmac [kg/ton] | CMC 2 [kg/ton] | Dewatering Time [sec] | Turbidity [NTU] | PCD (μeq/L) | CMC in liquid (g/L) |
|---|---|---|---|---|---|---|---|
| 1. | — | — | 10 | 9.9 | 400 | 162 | 2.37 |
| 2. | — | 0.5 | 10 | 9.4 | 272 | 136 | 2.23 |
| 3. | — | 1 | 10 | 8.9 | 300 | 125 | 2.05 |
| 4. | 0.5 | — | 10 | 8.5 | 245 | 128 | 1.53 |
| 5. | 0.5 | 0.5 | 10 | 7.6 | 200 | 102 | 1.27 |
| 6. | 0.5 | 1 | 10 | 6.8 | 160 | 87 | 1.03 |
| 7. | 1 | — | 10 | 7.2 | 184 | 94 | 1.04 |
| 8. | 1 | 0.5 | 10 | 6.3 | 165 | 82 | 0.75 |
| 9. | 1 | 1 | 10 | 6.1 | 135 | 64 | 0.54 |

EXAMPLE 12

This Example illustrates the use in papermaking of filler compositions according to Example 10. Drainage, retention and PCD were evaluated according to the general procedure of Example 7. Filler compositions were added in amounts so as to achieve filler content of approximately 35% by weight. The results are shown in Table 4, in which PAC [kg/ton] means the amount of PAC calculated as $Al_2O_3$ per ton of GCC, and PS 158 [kg/ton] means the amount of the specific A-starch per ton of GCC.

TABLE 4

| Test No. | PAC [kg/ton] | PS 158 [kg/ton] | Dewatering time [sec] | Turbidity [NTU] | PCD (μeq/L) |
|---|---|---|---|---|---|
| 1 | — | — | 5.1 | 120 | 33 |
| 2 | — | 10 | 5.8 | 120 | 66 |
| 3 | — | 20 | 5.8 | 185 | 98 |
| 4 | — | 40 | 6.5 | 190 | 150 |
| 5 | 0.5 | 10 | 3.6 | 100 | 39 |
| 6 | 0.5 | 20 | 4.3 | 115 | 63 |
| 7 | 0.5 | 40 | 4.7 | 140 | 117 |
| 8 | 1 | 10 | 3.5 | 90 | 30 |
| 9 | 1 | 20 | 4.0 | 95 | 55 |
| 10 | 1 | 40 | 4.3 | 90 | 103 |
| 11 | 2 | 10 | 3.6 | 100 | 25 |
| 12 | 2 | 20 | 3.6 | 100 | 42 |
| 13 | 2 | 40 | 4.1 | 125 | 88 |

EXAMPLE 13

This example illustrates a method of continuous preparation of filler compositions. An aqueous GCC slurry (75% by weight GCC) is continuously diluted by water to 45% by weight. To this dilution water an aqueous PA solution (20% by weight PA) and an aqueous PAC solution (10% by weight, calculated as Al2O3) were added continuously. The resulting composition was submitted to a $1^{st}$ static mixer and an aqueous CMC solution (2% by weight CMC) was added. The resulting composition was submitted to a $2^{nd}$ static mixer. The final composition was 30% by weight solids.

EXAMPLE 14

This example illustrates the use in pilot PM papermaking trials of filler compositions according to Example 13. Paper was produced at approximately 80 GSM continuously on the PMXp in Markaryd, Sweden. Pulp was based on needle kraft pulp (NBKP) and leaf bleached kraft pulp (LBKP). At various positions in the papermaking approach system chemicals and filler compositions were added. C-starch (2% by weight C-starch) was added before Machine chest pump, PAC (10% by weight PAC, calculated as $Al_2O_3$) was added in white water tray, filler composition was added before headbox pump, C-PAM 2 (0.067% by weight) was added after headbox pump and silica (0.5% by weight) was added just before headbox inlet. The headbox stock was 0.4% by weight. Strength properties of the obtained paper were evaluated by measuring tensile strength, Scott bond, Z-tensile strength and Wax pick (all supplied by Lorenzen & Wettre, Sweden). Specific drying energy (kW) was evaluated.

TABLE 5

| | Chemicals (based on produced paper) | | | | Filler composition (based on dry filler) | | |
|---|---|---|---|---|---|---|---|
| Test No. | PAC kg/t | CS kg/t | PL 1510 Kg/t | NP 320 kg/t | CMC 2 kg/t | PAC kg/t | PA kg/t |
| 1 | 1 | 8 | 0.2 | 6 | 0 | 0 | 0 |
| 2 | 1 | 11.2 | 0.28 | 6 | 0 | 0 | 0 |
| 3 | 1 | 9.6 | 0.24 | 6 | 10 | 1 | 3 |
| 4 | 1 | 11.2 | 0.28 | 6 | 10 | 1 | 3 |

| | Sheet properties | | | | PM data |
|---|---|---|---|---|---|
| Test No. | Filler % | Tensile index kNm/kg | Scott bond J/m2 | Z-tensile strength kPa | Wax pick number | Dryer setting kW |
| 1 | 24.6 | 28.91 | 164.22 | 475.7 | 7 | 90 |
| 2 | 35.6 | 19.77 | 128.1 | 427 | 6 | 50 |
| 3 | 23.9 | 40.25 | 364.14 | 524.4 | 13 | 80 |
| 4 | 35.9 | 30.99 | 299.04 | 490.1 | 9 | 45 |

EXAMPLE 15

This Example illustrates the use in papermaking of filler compositions according to Examples 2 and 5. Drainage and retention presented in table 6 below were evaluated according to the general procedure of Example 7. The following chemicals were also added in a consistent manner in the following sequence before making the drainage and retention tests: C-Starch (8 kg/ton based on dry paper sheet) added 45 s before drainage, C-PAM 2 (0.1 kg/ton based on dry paper sheet) added 15 s before drainage, Silica (0.5 kg/ton, calculated as $SiO_2$ and based on dry paper sheet) added 5 s before drainage.

TABLE 6

| Test no | PAC (kg/t) | CMC 1 (kg/t) | CMC 2 (kg/t) | Dewatering time (sec) | Turbidity (NTU) |
|---|---|---|---|---|---|
| 1 | — | — | — | 6.4 | 223 |
| 2 | — | 1 | — | 15.6 | 453 |
| 3 | — | 3 | — | 20.5 | 585 |
| 4 | — | 5 | — | 23 | 730 |
| 5 | — | 10 | — | 27.4 | 1150 |
| 6 | 0.2 | 1 | — | 4.9 | 177 |
| 7 | 0.6 | 3 | — | 13 | 408 |
| 8 | 1 | 5 | — | 18.5 | 537 |
| 9 | — | — | 1 | 8.1 | 273 |
| 10 | — | — | 3 | 14.2 | 355 |
| 11 | — | — | 5 | 17.6 | 427 |
| 12 | 0.2 | — | 1 | — | — |
| 13 | 0.6 | — | 3 | 4.1 | 240 |
| 14 | 1 | — | 5 | 8.5 | 276 |

The invention claimed is:

1. A filler composition comprising
   a) a filler,
   b) a cationic inorganic compound which is a polyaluminum chloride,
   c) a cationic organic compound which is a polymer having a weight average molecular weight up to about 700,000 and a charge density in the range of from about 1 up to about 15 meq/g, and
   d) an anionic polysaccharide selected from the group consisting of starch and cellulose derivatives,
   wherein the filler is present in an amount of at least about 1% by weight, based on the total weight of the composition, the cationic inorganic and organic compounds are each present in an amount of from about 0 to about 30 kg/ton, based on the weight of filler, whereby the composition comprises at least one of the cationic inorganic and organic compounds, and the anionic polysaccharide has a degree of substitution of net anionic groups of up to about 0.50.

2. The composition according to claim 1, wherein the composition has a fibre content of from about 0 to about 5% by weight, based on the composition.

3. A method of preparing a filler composition comprising mixing
   a) a filler,
   b) a cationic inorganic compound which is a polyaluminum chloride,
   c) a cationic organic compound which is a polymer having a weight average molecular weight up to about 700,000 and a charge density in the range of from about 1 up to about 15 meq/g, and
   d) an anionic polysaccharide selected from the group consisting of starch and cellulose derivatives,
   whereby in the obtained filler composition the filler is present in an amount of at least about 1% by weight, based on the total weight of the composition, the cationic inorganic and organic compounds are each present in an amount of from about 0 to about 30 kg/ton, based on the weight of filler, whereby the composition comprises at least one of the cationic inorganic and organic compounds, and the anionic polysaccharide has a degree of substitution of the net anionic groups of up to about 0.50.

4. The method according to claim 3, wherein the cationic inorganic and/or cationic organic compounds are added as a premix to the filler.

5. The method according to claim 3, wherein the cationic polyaluminum chloride and/or cationic organic compounds are added separately to the filler.

6. The method according to claim 3, wherein the anionic polysaccharide is added to the filler subsequently to adding the cationic inorganic and/or organic compounds.

7. The method according to claim 3, wherein the method is performed in a filler line of a paper machine.

8. The composition according to claim 1, wherein the filler is selected from the group consisting of kaolin, china clay, titanium dioxide, gypsum, talc and calcium carbonate.

9. The composition according to claim 1, wherein the filler is calcium carbonate.

10. The composition according to claim 1, wherein the filler is present in the composition in an amount of from about 5 to about 50% by weight, based on the composition.

11. The composition according to claim 1, wherein the cationic inorganic compound is present in the composition in an amount from about 0.1 to about 15 kg/ton, based on the weight of filler.

12. The composition according to claim 1, wherein the cationic organic compound has a charge density in the range of from about 1 to about 10 meq/g.

13. The composition according to claim 1, wherein the cationic organic compound is present in the composition in an amount from about 0.1 to about 15 kg/ton, based on the weight of filler.

14. The composition according to claim 1, wherein the anionic polysaccharide is substantially free from cationic groups.

15. The composition according to claim 1, wherein the anionic polysaccharide has quaternary ammonium groups.

16. The composition according to claim 1, wherein the anionic polysaccharide has a degree of substitution of net anionic groups ranging from about 0.15 to about 0.50.

17. The composition according to claim 1, wherein the anionic polysaccharide is present in the composition in an amount of from about 3 to about 30 kg/ton, based on the weight of filler.

18. The composition according to claim 1, wherein the composition is an aqueous composition.

19. The composition according to claim 1, wherein the composition is substantially free from fibers and fibrils of cellulose or lignocellulose.

20. The composition according to claim 1, wherein the composition comprises fibers or fibrils of cellulose or lignocellulose in an amount of less than about 1% by weight, based on the filler.

21. The composition according to claim 1, wherein the composition is substantially free from cationic starch.

22. The composition according to claims 1, wherein the weight ratio of cationic inorganic compound and/or cationic organic compound to anionic polysaccharide is from about 1:1 to about 1:40.

23. A process of producing paper comprising adding a filler composition as claimed in claim 1 to an aqueous cellulosic suspension and draining the obtained suspension.

24. The process according to claim 23, wherein the process further comprises adding a siliceous material to the aqueous cellulosic suspension.

25. The process according to claim 24, wherein the siliceous material comprises silica-based particles or bentonite.

26. The process according to claim 23, wherein a sizing agent is either added to the aqueous cellulosic suspension or applied to the paper.

27. Paper obtainable by a process as claimed in claim 23.

28. Paper comprising a filler composition as defined in claim 1.

29. The composition according to claim 1, wherein the cationic organic compound is selected from the group consisting of cationic polyamines, cationic polyamideamines, cationic polyethylene imines, cationic dicyandiamide polymers, cationic acrylamide-based polymers, cationic acrylate-based polymers, cationic vinylamine/vinylfromamide-based polymers, and cationic polymers based on diallyl dialkyl ammonium chlorides.

30. The composition according to claim 29, wherein the cationic organic compound is selected from the group consisting of cationic polyamines and cationic vinyl addition polymers of a blend of monomers comprising at least diallyl dialkyl ammonium chloride.

31. The composition according to claim 1, wherein the anionic polysaccharide is cellulose derivative.

32. The composition according to claim 1, wherein the anionic polysaccharide is carboxyalkyl cellulose.

33. The composition according to claim 1, wherein the filler is selected from the group consisting of kaolin, calcium carbonate and mixtures thereof;
   wherein the cationic organic compound is a polymer having a weight average molecular weight from about 1,000 up to about 700,000 and is selected from the group consisting of polyamines and cationic vinyl addition polymers of a blend of monomers comprising at least diallyl dimethyl ammonium chloride;
   wherein the anionic polysaccharide is selected from the group consisting of starch and carboxyalkyl cellulose; and
   wherein the anionic polysaccharide has a degree of substitution of net anionic groups of up to about 0.50.

* * * * *